(12) United States Patent
Yang et al.

(10) Patent No.: US 11,511,802 B2
(45) Date of Patent: Nov. 29, 2022

(54) DISTRIBUTED SYSTEM ARCHITECTURE FOR AN AUTONOMOUS STEERING SYSTEM

(71) Applicant: STEERING SOLUTIONS IP HOLDING CORPORATION, Saginaw, MI (US)

(72) Inventors: Kun Yang, Suzhou (CN); Pierre C. Longuemare, Paris (FR); David Fan, Suzhou (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 68 days.

(21) Appl. No.: 17/123,815

(22) Filed: Dec. 16, 2020

(65) Prior Publication Data

US 2022/0097766 A1 Mar. 31, 2022

(30) Foreign Application Priority Data

Sep. 29, 2020 (CN) .......................... 202011046918.1

(51) Int. Cl.
*B62D 15/02* (2006.01)
*B60W 60/00* (2020.01)

(52) U.S. Cl.
CPC ......... *B62D 15/021* (2013.01); *B60W 60/001* (2020.02); *B60W 2710/083* (2013.01)

(58) Field of Classification Search
CPC ..... B62D 15/02; B62D 15/021; B60W 60/00; B60W 60/001; H04L 1/22
See application file for complete search history.

(56) References Cited

U.S. PATENT DOCUMENTS

| 9,606,537 B2 * | 3/2017 | Hogenmueller ...... B60W 30/00 |
| 2007/0027603 A1 * | 2/2007 | Katrak ................ G06F 11/1608 701/70 |

(Continued)

FOREIGN PATENT DOCUMENTS

| DE | 102014220781 A1 | 4/2016 |
| DE | 102018002156 A1 | 9/2019 |

OTHER PUBLICATIONS

Official Letter from the German Patent and Trademark Office for related German Patent Application No. 102020128235.4 dated Mar. 9, 2021, English Translation included.

*Primary Examiner* — Tan Q Nguyen
(74) *Attorney, Agent, or Firm* — Dickinson Wright PLLC (57) ABSTRACT

A method for controlling an electronic power steering system may include receiving, at an electronic power steering controller, at least one signal from at least one sensor and generating, by the electronic power steering controller using the at least one signal, a first autonomous steering command. The method may also include receiving, from a domain controller at the electronic power steering controller, a second autonomous steering command and comparing, by the electronic power steering controller, the first autonomous steering command and the second autonomous steering command. The method may also include selectively controlling, by the electronic power steering controller, the electronic power steering system using one of the first autonomous steering command and the second autonomous steering command, based on the comparison of the first autonomous steering command and the second autonomous steering command.

17 Claims, 3 Drawing Sheets

(56) References Cited

U.S. PATENT DOCUMENTS

| | | | | |
|---|---|---|---|---|
| 2008/0065294 A1* | 3/2008 | Katrak | ................... | B62D 5/008 |
| | | | | 180/443 |
| 2012/0265359 A1* | 10/2012 | Das | ........................ | G06F 13/42 |
| | | | | 700/286 |
| 2019/0283768 A1* | 9/2019 | Das | ..................... | B60W 50/023 |
| 2021/0009194 A1* | 1/2021 | Kim | ....................... | B62D 6/007 |

* cited by examiner

DISTRIBUTED SYSTEM ARCHITECTURE FOR AN AUTONOMOUS STEERING SYSTEM

CROSS-REFERENCES TO RELATED APPLICATIONS

This patent application claims priority to Chinese Patent Application Serial No. 202011046918.1, filed Sep. 29, 2020 which is incorporated herein by reference in its entirety.

TECHNICAL FIELD

This disclosure relates to steering systems and in particular to systems and methods or a distributed architecture for autonomous steering systems.

BACKGROUND

Vehicles, such as cars, trucks, sport utility vehicles, crossovers, mini-vans, marine craft, aircraft, all-terrain vehicles, recreational vehicles, or other suitable vehicles, are increasingly including autonomous features, such as advanced driver-assistance systems (ADAS) and the like. Such autonomous features may be configured to control various aspects of vehicle operation, such as vehicle propulsion, vehicle braking, vehicle steering, and the like.

Typically, steering systems of such vehicles, such as electronic power steering systems or other suitable steering systems, typically receive torque or other suitable commands from a domain control of a corresponding vehicle. In response to receiving a torque command or other suitable command, the steering system may control or operate various steering functions of the corresponding vehicle.

SUMMARY

This disclosure relates generally to steering systems.

An aspect of the disclosed embodiments includes a method for controlling an electronic power steering system. The method may include receiving, at an electronic power steering controller, at least one signal from at least one sensor and generating, by the electronic power steering controller using the at least one signal, a first autonomous steering command. The method may also include receiving, from a domain controller at the electronic power steering controller, a second autonomous steering command and comparing, by the electronic power steering controller, the first autonomous steering command and the second autonomous steering command. The method may also include selectively controlling, by the electronic power steering controller, the electronic power steering system using one of the first autonomous steering command and the second autonomous steering command, based on the comparison of the first autonomous steering command and the second autonomous steering command.

Another aspect of the disclosed embodiments includes a system for controlling an electronic power system. The system includes a processor and a memory. The memory includes instructions that, when executed by the processor, cause the processor to: receive at least one signal from at least one sensor; generate, using the at least one signal, a first autonomous steering command; receive, from a domain controller, a second autonomous steering command; compare the first autonomous steering command and the second autonomous steering command; and selectively control the electronic power steering system using one of the first autonomous steering command and the second autonomous steering command, based on the comparison of the first autonomous steering command and the second autonomous steering command.

Another aspect of the disclosed embodiments includes an apparatus for controlling a steering system. The apparatus includes a processor and a memory. The memory includes instructions that, when executed by the processor, cause the processor to: receive at least one signal from at least one sensor; generate, using the at least one signal, a first autonomous steering command; receive, from a controller, a second autonomous steering command; compare the first autonomous steering command and the second autonomous steering command; and selectively control the steering system using one of the first autonomous steering command and the second autonomous steering command, based on the comparison of the first autonomous steering command and the second autonomous steering command.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, marine craft, aircraft, all-terrain vehicles, recreational vehicles, or other suitable vehicles, are increasingly including autonomous features, such as advanced driver-assistance systems (ADAS) and the like. Such autonomous features may be configured to control various aspects of vehicle operation, such as vehicle propulsion, vehicle braking, vehicle steering, and the like.

Typically, steering systems of such vehicles, such as electronic power steering systems or other suitable steering systems, typically receive torque or other suitable commands from a domain control of a corresponding vehicle. In response to receiving a torque command or other suitable command, the steering system may control or operate various steering functions of the corresponding vehicle.

Typically, while such steering systems play a key role in autonomous control and/or operation of such vehicles, function of such steering systems may be limited to actuation or other similar function. As vehicles continue to include an increasing number of autonomous functions, such as ADAS and/or other suitable functions, a steering system controller of the steering system may be increasingly configured to provide additional functions, such as handwheel redundancy, processor capabilities, and the like. Such additional functions may increase the manufacturing costs of such steering system controllers, while the steering system controller continues to function, primarily, as an actuator. Further, an associated domain controller may be configured to process signals from multiple sources, while providing universal architecture to compatible systems, without strict redundancy (e.g. from functional safety). Additionally, or alternatively, the steering system of typical vehicles may be configured according to safety regulations and standards, while relying on external commands (e.g., from the domain controller and/or other suitable source) for lateral control during autonomous operation of the vehicle.

Accordingly, systems and methods, such as those described herein, that may be configured to provide a distributed system architecture for autonomous steering systems, may be desirable. In some embodiments, the systems and methods described herein may be configured to receive information from and/or communicate with various sources. The various sources may include one or more image-capturing sensors (e.g., such as camera sensing units or other suitable image-capturing sensors or devices), one or more ultrasonic sensors or devices, one or more light detection and ranging (LIDAR) sensors or devices, one or more radio detection and ranging (RADAR) sensors or devices, vehicle driving information sensors or devices, domain controllers, steering system controllers (e.g., such as electronic power steering system (EPS) controllers or other suitable steering controllers), torque sensors or devices, handwheel position sensors or devices, steering system actuators (e.g., such as EPS actuators and/or other suitable steering system actuators), other suitable sensors and/or devices, or a combination thereof.

In some embodiments, the systems and methods described herein may be configured to provide a vehicle domain controller configured to receive signals from the various sources. The domain controller may be configured to generate one or more steering commands based on the received signals. The domain controller may communicate the one or more steering commands to the steering system controller for each respective autonomous vehicle function definition (e.g. each respective ADAS function definition and/or other suitable autonomous vehicle function definition).

In some embodiments, the systems and methods described herein may be configured to receive, at the steering system controller, the signals from the various sources. The steering system controller may be configure to generate one or more steering commands based on the received signals. For example, the steering system controller may be configured to communicate with the various sources (e.g., using a flex communication module or other suitable module or mechanism capable of communicating with the various sources). The systems and methods described herein may be configured to provide selectively adjustable communication rate control based on one or more characteristics and/or capabilities of the steering system controller.

In some embodiments, the systems and methods described herein may be configured to provide, at the steering system controller, backup lateral control mission, lateral path planning, assist torque distribution, operator torque demand, and the like. In some embodiments, the systems and methods described herein may be configured to determine safe lateral control motion (e.g., backup lateral control mission), at the steering system controller using received information from the various sources. In some embodiments, the systems and methods described herein may be configured to calculate an optimized operating path (e.g., lateral path planning), at the steering system controller, to achieve lateral control motion.

In some embodiments, the systems and methods described herein may be configured to define a suitable motor operation mode e.g., assist torque distribution), at the steering system controller, to align with an expected operating path and/or operating torque demand. In some embodiments, the steering system controller may be configured to operate as a slave electronic control unit (ECU) of the vehicle and the domain controller may be configured to operate as a master ECU of the vehicle (e.g., during autonomous vehicle control or other suitable operating conditions).

In some embodiments, the systems and methods described herein may be configured to compare, at the steering system controller, a steering command received from the domain controller with a steering command generated by the steering system controller. The steering system controller may be configured to follow the steering command received from the domain controller, as a priority command. The systems and methods described herein may be configured to communication feedback, from the steering system controller to the domain controller, in response to a determination that the steering command received from the domain controller is different from the steering command generated by the steering system controller, while continue to follow the steering command from the domain controller at the steering system controller, as a priority command.

In some embodiments, the systems and methods described herein may be configured to, at the steering system controller, using the steering command generated by the steering system controller as the priority command, in response to a determination, during autonomous operation of the vehicle or other suitable operating condition of the vehicle, that the domain controller has shut down, that communication between domain controller and the steering system controller has been lost, and/or that an issue has occurred in the domain controller. The systems and methods described herein may be configured to control, using the steering system controller, a steering system actuator (e.g., such as an EPS actuator or other suitable steering system actuator) based on the priority command.

In some embodiments, the systems and methods described herein may be configured to receive, at an electronic power steering controller, at least one signal from at least one sensor. The at least one sensor ma include an image-capturing sensor, an ultrasonic sensor, a light detection and ranging sensor, a radio detection and ranging sensor, a torque sensor, a handwheel position sensor, other suitable sensors, or a combination thereof.

The systems and methods described herein may be configured to generate, using the electronic power steering controller using the at least one signal, a first autonomous steering command. The systems and methods described herein may be configured to receive, from a domain controller at the electronic power steering controller, a second autonomous steering command. The systems and methods described herein may be configured to compare, using the electronic power steering controller, the first autonomous steering command and the second autonomous steering command. The systems and methods described herein may be configured to selectively control, using the electronic power steering controller, an electronic power steering system using one of the first autonomous steering command and the second autonomous steering command, based on the comparison of the first autonomous steering command and the second autonomous steering command.

In some embodiments, the systems and methods described herein may be configured to, in response to the comparison of the first autonomous steering command and the second autonomous steering command indicating that the first autonomous steering command is within a predetermined range of the second autonomous steering command, selectively control, using the electronic power steering controller, the electronic power steering system using the second autonomous command.

In some embodiments, the systems and methods described herein may be configured to, in response to the comparison of the first autonomous steering command and the second autonomous steering command indicating that the first autonomous steering command is not within a predetermined range of the second autonomous steering command, selectively control, using the electronic power steering controller, the electronic power steering system using the second autonomous command.

In some embodiments, the systems and methods described herein may be configured to communicate, using the electronic power steering controller, a signal to the domain controller indicating that the first autonomous steering command is not within the predetermined range of the second autonomous steering command. In some embodiments, the systems and methods described herein may be configured to determine, using the electronic power steering controller, whether an issue occurred in the domain controller. In some embodiments, the systems and methods described herein may be configured to, in response to a determination that an issue occurred with the domain controller, selectively control, using the electronic power steering system, the electronic power steering system using the first autonomous steering command.

Figure 1:
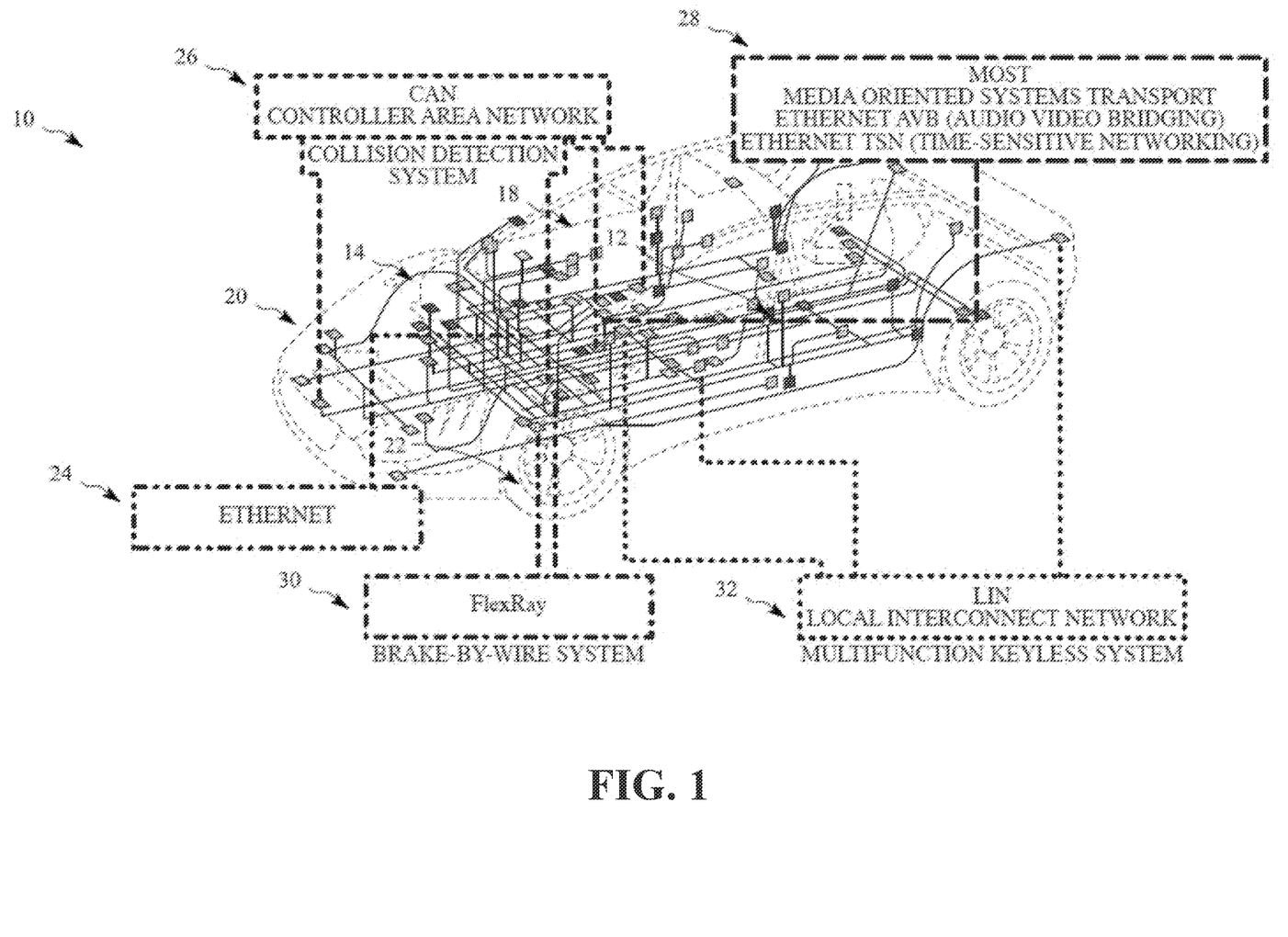
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system or other suitable steering system. The steering system may be configured to receive various inputs, including, but not limited to, a handwheel position, an input torque, one or more roadwheel positions, other suitable inputs or information, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
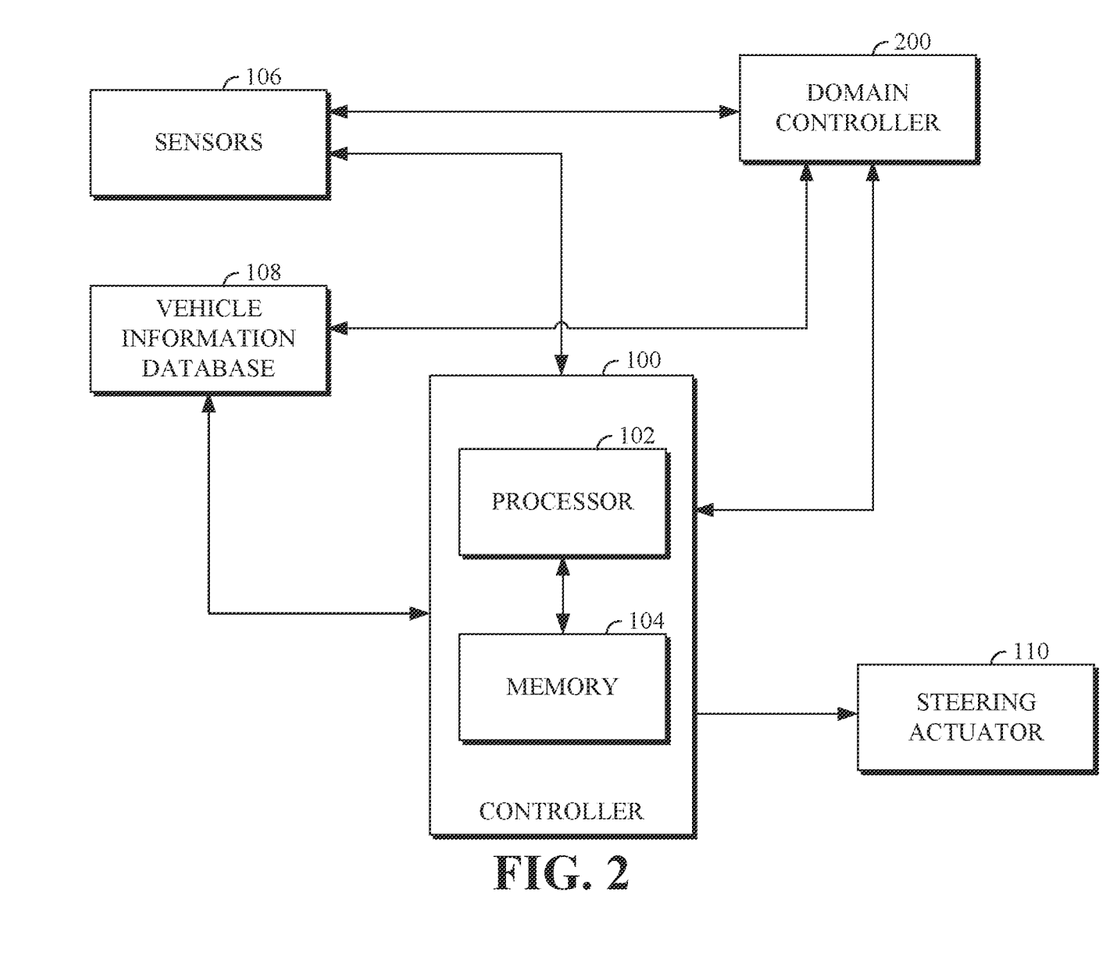
FIG. 2 generally illustrates a steering system control system according to the principles of the present disclosure.

In some embodiments, the steering system may include a steering system controller, such as controller 100, as is generally illustrated in FIG. 2. The controller 100 may include any suitable controller. The controller 100 may be configured to control, for example, the various functions of the steering system. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various functions of the steering system.

In some embodiments, the controller 100 may communicate with a domain controller 200. The domain controller 200 may include any suitable controller. The domain controller 200 may include a processor and a memory, similar to or different from those of the controller 100. In some embodiments, the domain controller 200 may control various aspects of the vehicle 10. For example, the vehicle 10 may include one or more autonomous mechanisms and/or features, such as an ADAS mechanism and/or other suitable autonomous mechanism and/or feature. The domain controller 200 may be configure to control various aspects of the autonomous mechanisms and/or features of the vehicle 10. It should be understood that the vehicle 10 may include any suitable number of controllers, including one or more additional domain controllers and/or one or more additional steering system controllers.

In some embodiments, the domain controller 200 may be configured to receive input and/or information from various sources of the vehicle 10. For example, the domain controller 200 may receive one or more signals from various measurement devices or sensors 106 indicating sensed or measured characteristics of the vehicle 10 and/or an operating environment corresponding to the vehicle 10. The sensors 106 may include any suitable sensors, measurement devices, and/or other suitable mechanisms. Additionally, or alternatively, the sensors 106 and/or any suitable number of sensors, measurement devices, and/or other suitable mechanisms. For example, the sensors 106 may include one or more image-capturing sensors (e.g., such as camera sensing units or other suitable image-capturing sensors or devices), one or more ultrasonic sensors or devices, one or more LIDAR sensors or devices, one or more RADAR sensors or devices, one or more torque sensors or devices, one or more handwheel position sensors or devices, other suitable sensors or devices, or a combination thereof.

In some embodiments, the domain controller 200 may receive various vehicle information from a vehicle information database 108. The database 108 may include any suitable database, table, storage device, memory, and/or the like. The database 108 may be disposed within the vehicle 10, disposed on a remotely located computing device (e.g., on a remotely located server), or partially disposed within the vehicle 10 and partially disposed on a remotely located computing device. The database 108 may be configured to receive various vehicle information corresponding to the vehicle 10 from various sources, such as other controllers within the vehicle 10 and/or other suitable sources. Additionally, or alternatively, the database 108 may be prepopulated with vehicle information corresponding to the vehicle 10, such as make, model, and the like. It should be understood that the database 108 may include any suitable vehicle information and/or other information.

In some embodiments, the domain controller 200 may generate one or more steering commands, during autonomous operation or other suitable operating condition of the vehicle 10, based on at least some of the signals received from the sensors 106 and/or the database 108. For example, the domain controller 200 may generate a steering command based on a torque signal, a handwheel position signal, an image signal (e.g., including image data that indicates various aspects of the operating environment corresponding to the vehicle 10), LIDAR or RADAR signals (e.g., indicating location, speed, or other information corresponding to other vehicles in the operating environment relative to the vehicle 10), and/or any other suitable signal or information. The steering command may indicate an amount of torque to be applied to a steering actuator in order to achieve a desired control or operation of the steering system. It should be understood the steering command may include any suitable information or value.

The domain controller 200 may communicate the steering command to the controller 100 (e.g., during autonomous operation or other suitable operating condition of the vehicle 10). The controller 100, using the steering command, may selectively control a steering actuator 110. The steering actuator 110 may be any suitable steering actuator, such as an EPS actuator or other suitable steering actuator. Additionally, or alternatively, the steering actuator 110 may include two or more steering actuators. Controlling the steering actuator 110 using the steering command (e.g., or one or more steering commands) may cause the steering actuator 110 to control or operate various aspects of the steering system of the vehicle 10. In this manner, the domain controller 200 may operate as the master controller and the controller 100 may operate as the slave controller to the domain controller 200.

In some embodiments, the controller 100 may be configured to operate as a redundant controller to the domain controller 200. For example, the controller 100 may receive the various signals from the sensors 106 and/or the vehicle information from the database 108 (e.g., contemporaneously or substantially contemporaneously with the domain controller 200). The controller 100 may generate one or more steering commands using at least some of the signals received from the sensors 106 and/or at least some vehicle information received from the database 108. For example, the controller 100 may generate a steering command based on a torque signal, a handwheel position signal, an image signal (e.g., including image data that indicates various aspects of the operating environment corresponding to the vehicle 10), LIDAR or RADAR signals (e.g., indicating location, speed, or other information corresponding to other vehicles in the operating environment relative to the vehicle 10), and/or any other suitable signal or information In some embodiments, the controller 100 may be configured to receive, from the domain controller 200, the steering command generated by the domain controller 200. The controller 100 may determine whether the steering command received from the domain controller 200 is within a predetermined range of the steering command generated by the controller 100. For example, the controller 100 may compare the steering command received from the domain controller 200 to the steering command generated by the controller 100. Based on the comparison, the controller 100 may determine whether a difference between the steering command received from the domain controller 200 and the steering command generated by the controller 100 is greater than a threshold value. Additionally, or alternatively, the controller 100 may determine, based on the comparison, whether the steering command received from the domain controller 200 is within a predetermined range of the steering command generated by the controller 100. The predetermined range may include a plus or minus a percentage value, plus or minus a numeric value, or any suitable range.

The controller 100 may selectively control the steering actuator 110 using one of the steering command received from the domain controller 200 and the steering command generated by the controller 100. For example, if the controller 100 determines that the steering command received from the domain controller 200 is within the predetermined range of the steering command generated by the controller 100 and/or that the difference between the steering command received from the domain controller 200 and the steering command generated by the controller 100 is less than the threshold, the controller 100 may control the steering actuator 110 using the steering command received from the domain controller 200.

Alternatively, if the controller 100 determines that the steering command received from the domain controller 200 is not within the predetermined range of the steering command generated by the controller 100 and/or that the difference between the steering command received from the domain controller 200 and the steering command generated by the controller 100 is greater than the threshold, the controller 100 may control the steering actuator 110 using the steering command received from the domain controller 200 and may communicate a signal to the domain controller 200 indicating that the steering command received from the domain controller 200 is not within the predetermined range of the steering command generated by the controller 100 and/or that the difference between the steering command received from the domain controller 200 and the steering command generated by the controller 100 is greater than the threshold.

In some embodiments, the controller 100 may be configured to determine whether communication between the domain controller 200 and the controller 100 has been lost or interrupted. For example, the controller 100 may be configured to receive, at least, the one or more steering commands, as described, from the domain controller 200. If the controller 100 does not receive a steering command from the domain controller 200 after a predetermined period, the controller 100 may determine that communication between the domain controller 200 and the controller 100 has been lost or interrupted. It should that the controller 100 may determine that communication between the domain controller 200 and the controller 100 has been lost or interrupted using any suitable technique other than or in addition to those described herein.

Additionally, or alternatively, the controller 100 may be configured to determine whether an issue occurred in the domain controller 200. The issue may include a fault or other issue that renders the domain controller 200 at least partially inoperable. The controller 100 may monitor a flag, status bit, or other suitable indicator (e.g., stored in a memory of the vehicle 10 or other suitable location) that indicates whether an issue has occurred in the domain controller 200. It should be understood that the controller 100 may be configured to determine whether an issue occurred in the domain controller 200 using any suitable technique other than or in addition to those described herein.

If the controller 100 determines that communication between the controller 100 and the domain controller 200 has been lost or interrupted and/or that an issue occurred in the domain controller 200, the controller 100 may selectively control the steering actuator 110 using the steering command generated by the controller 100. The steering actuator 110 may operate according to one or more steering commands applied to the steering actuator 110 by the controller 100.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 3:
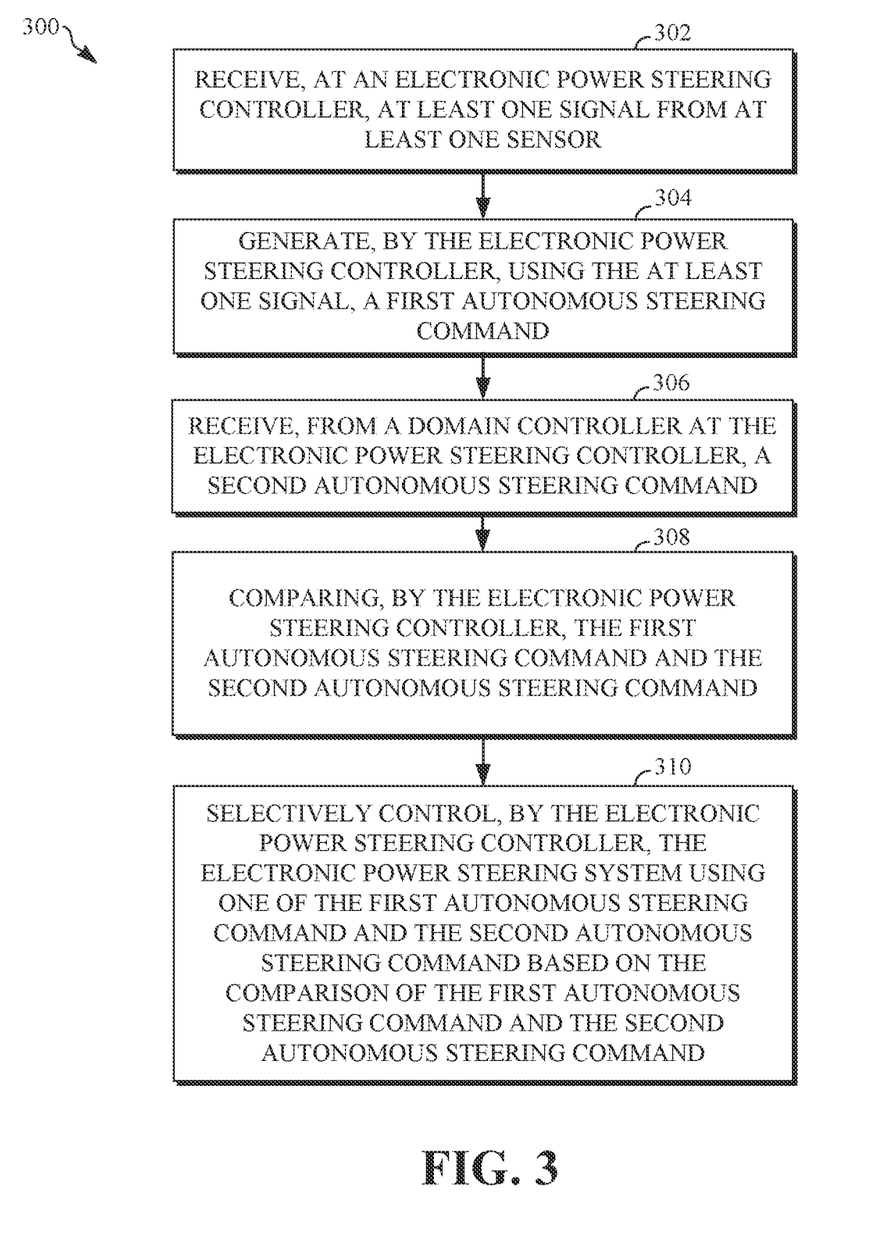
FIG. 3 is a flow diagram generally illustrating a steering system control method according to the principles of the present disclosure.

FIG. 3 is a flow diagram generally illustrating a steering system control method 300 according to the principles of the present disclosure. At 302, the method 300 receives, at an electronic power steering controller, at least one signal from at least one sensor. For example, the controller 100 receives the various signals from the sensors 106 and/or various vehicle information from the database 108.

At 304, the method 300 generates, using the electronic power steering controller using the at least one signal, a first autonomous steering command. For example, the controller 100 generates a steering command using at least some of the signals received from the sensors 106 and/or at least some of the vehicle information received from the database 108.

At 306, the method 300 receives, from a domain controller at the electronic power steering controller, a second autonomous steering command. For example, the controller 100 receives one or more steering commands from the domain controller 200.

At 308, the method 300 compares, using the electronic power steering controller, the first autonomous steering command and the second autonomous steering command. For example, the controller 100 compares a steering command generated by the controller 100 to a steering command received from the domain controller 200.

At 310, the method 300 selectively controls, using the electronic power steering controller, the electronic power steering system using one of the first autonomous steering command and the second autonomous steering command, based on the comparison of the first autonomous steering command and the second autonomous steering command. For example, the controller 100 selectively controls the steering actuator 110 using one of the steering command generated by the controller 100 and the steering command received from the domain controller 200, based on the comparison between the steering command generated by the controller 100 and the steering command received from the domain controller 200.

In some embodiments, a method for controlling an electronic power steering system may include receiving, at an electronic power steering controller, at least one signal from at least one sensor and generating, by the electronic power steering controller using the at least one signal, a first autonomous steering command. The method may also include receiving, from a domain controller at the electronic power steering controller, a second autonomous steering command and comparing, by the electronic power steering controller, the first autonomous steering command and the second autonomous steering command. The method may also include selectively controlling, by the electronic power steering controller, the electronic power steering system using one of the first autonomous steering command and the second autonomous steering command, based on the comparison of the first autonomous steering command and the second autonomous steering command.

In some embodiments, the method may also include, in response to the comparison of the first autonomous steering command and the second autonomous steering command indicating that the first autonomous steering command is within a predetermined range of the second autonomous steering command, selectively controlling, by the electronic power steering controller, the electronic power steering system using the second autonomous command. In some embodiments, the method may also include, in response to the comparison of the first autonomous steering command and the second autonomous steering command indicating that the first autonomous steering command is not within a predetermined range of the second autonomous steering command, selectively controlling, by the electronic power steering controller, the electronic power steering system using the second autonomous command and communicating, by the electronic power steering controller, a signal to the domain controller indicating that the first autonomous steering command is not within the predetermined range of the second autonomous steering command. In some embodiments, the method may also include determining, by the electronic power steering controller, whether an issue occurred in the domain controller. In some embodiments, the method may also include, in response to a determination that an issue occurred with the domain controller, selectively controlling, by the electronic power steering system, the electronic power steering system using the first autonomous steering command. In some embodiments, the at least one sensor includes an image-capturing sensor. In some embodiments, the at least one sensor includes an ultrasonic sensor. In some embodiments, the at least one sensor includes a light detection and ranging sensor. In some embodiments, the at least one sensor includes a radio detection and ranging sensor.

In some embodiments, the at least one sensor includes a torque sensor. In some embodiments, the at least one sensor includes a handwheel position sensor.

In some embodiments, a system for controlling an electronic power system includes a processor and a memory. The memory includes instructions that, when executed by the processor, cause the processor to: receive at least one signal from at least one sensor; generate, using the at least one signal, a first autonomous steering command; receive, from a domain controller, a second autonomous steering command; compare the first autonomous steering command and the second autonomous steering command; and selectively control the electronic power steering system using one of the first autonomous steering command and the second autonomous steering command, based on the comparison of the first autonomous steering command and the second autonomous steering command.

In some embodiments, the instructions further cause the processor to, in response to the comparison of the first autonomous steering command and the second autonomous steering command indicating that the first autonomous steering command is within a predetermined range of the second autonomous steering command, selectively control the electronic power steering system using the second autonomous command. In some embodiments, the instructions further cause the processor to, in response to the comparison of the first autonomous steering command and the second autonomous steering command indicating that the first autonomous steering command is not within a predetermined range of the second autonomous steering command: selectively control the electronic power steering system using the second autonomous command; and communicate a signal to the domain controller indicating that the first autonomous steering command is not within the predetermined range of the second autonomous steering command. In some embodiments, the instructions further cause the processor to determine whether an issue occurred in the domain controller. In some embodiments, the instructions further cause the processor to, in response to a determination that an issue occurred with the domain controller, selectively control the electronic power steering system using the first autonomous steering command.

In some embodiments, an apparatus for controlling a steering system includes a processor and a memory. The memory includes instructions that, when executed by the processor, cause the processor to: receive at least one signal from at least one sensor; generate, using the at least one signal, a first autonomous steering command; receive, from a controller, a second autonomous steering command; compare the first autonomous steering command and the second autonomous steering command; and selectively control the steering system using one of the first autonomous steering command and the second autonomous steering command, based on the comparison of the first autonomous steering command and the second autonomous steering command.

In some embodiments, the instructions further cause the processor to, in response to the comparison of the first autonomous steering command and the second autonomous steering command indicating that the first autonomous steering command is within a predetermined range of the second autonomous steering command, selectively control the steering system using the second autonomous command. In some embodiments, the instructions further cause the processor to, in response to the comparison of the first autonomous steering command and the second autonomous steering command indicating that the first autonomous steering command is not within a predetermined range of the second autonomous steering command: selectively control the steering system using the second autonomous command; and communicate a signal to the controller indicating that the first autonomous steering command is not within the predetermined range of the second autonomous steering command. In some embodiments, the instructions further cause the processor to: determine whether an issue occurred in the controller; and, in response to a determination that an issue occurred with the controller, selectively control the steering system using the first autonomous steering command.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations.

That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for controlling an electronic power steering system, the method comprising:
   receiving, at an electronic power steering controller, at least one signal from at least one sensor;
   generating, by the electronic power steering controller using the at least one signal, a first autonomous steering command;
   receiving, from a domain controller, a second autonomous steering command, wherein the domain controller generates the second autonomous steering command using the at least one signal from the at least one sensor or one or more other signals from the at least one sensor or one or more other sensors;
   comparing, by the electronic power steering controller, the first autonomous steering command and the second autonomous steering command; and
   in response to the comparison of the first autonomous steering command and the second autonomous steering command indicating that the first autonomous steering command is not within a predetermined range of the second autonomous steering command:
   selectively controlling, by the electronic power steering controller, the electronic power steering system using the second autonomous steering command; and
   communicating, by the electronic power steering controller, a signal to the domain controller indicating that the first autonomous steering command is not within the predetermined range of the second autonomous steering command.

2. The method of claim 1, further comprising, in response to the comparison of the first autonomous steering command and the second autonomous steering command indicating that the first autonomous steering command is within the predetermined range of the second autonomous steering command, selectively controlling, by the electronic power steering controller, the electronic power steering system using the second autonomous steering command.

3. The method of claim 1, wherein in response to the determination that the first autonomous steering command is not within the predetermined range of the second autonomous steering command, further comprising determining, by the electronic power steering controller, whether an issue occurred in the domain controller.

4. The method of claim 3, further comprising, in response to a determination that an issue occurred with the domain controller, selectively controlling, by the electronic power steering system, the electronic power steering system using the first autonomous steering command.

5. The method of claim 1, wherein the at least one sensor includes an image-capturing sensor.

6. The method of claim 1, wherein the at least one sensor includes an ultrasonic sensor.

7. The method of claim 1, wherein the at least one sensor includes a light detection and ranging sensor.

8. The method of claim 1, wherein the at least one sensor includes a radio detection and ranging sensor.

9. The method of claim 1, wherein the at least one sensor includes a torque sensor.

10. The method of claim 1, wherein the at least one sensor includes a handwheel position sensor.

11. A system for controlling an electronic power system, the system comprising:
   a processor; and
   a memory including instructions that, when executed by the processor, cause the processor to:
   receive at least one signal from at least one sensor;
   generate, using the at least one signal, a first autonomous steering command;

receive, from a domain controller, a second autonomous steering command, wherein the domain controller generates the second autonomous steering command using the at least one signal from the at least one sensor or one or more signals from the at least one sensor or one or more other sensors;

compare the first autonomous steering command and the second autonomous steering command; and in response to the comparison of the first autonomous steering command and the second autonomous steering command indicating that the first autonomous steering command is not within a predetermined range of the second steering command:

selectively control the electronic power steering system using the second autonomous steering command; and     communicate a signal to the domain controller indicating that the first autonomous steering command is not within the predetermined range of the second autonomous steering command.

12. The system of claim 11, wherein the instructions further cause the processor to, in response to the comparison of the first autonomous steering command and the second autonomous steering command indicating that the first autonomous steering command is within a predetermined range of the second autonomous steering command, selectively control the electronic power steering system using the second autonomous steering command.

13. The system of claim 11, wherein the instructions further cause the processor to, in response to the determination that the first autonomous steering command is not within the predetermined range of the second autonomous steering command, determine whether an issue occurred in the domain controller.

14. The system of claim 13, wherein the instructions further cause the processor to, in response to a determination that an issue occurred with the domain controller, selectively control the electronic power steering system using the first autonomous steering command.

15. An apparatus for controlling a steering system, the apparatus comprising:

a processor; and a memory including instructions that, when executed by the processor, cause the processor to:

receive at least one signal from at least one sensor;

generate, using the at least one signal, a first autonomous steering command;

receive, from a controller, a second autonomous steering command, wherein the controller generates the second autonomous steering command using the at least one signal from the at least one sensor or one or more other signals from the at least one sensor or one or more other sensors;

compare the first autonomous steering command and the second autonomous steering command; and in response to the comparison of the first autonomous steering command and the second autonomous steering command indicating that the first autonomous steering command is not within a predetermined range of the second autonomous steering command:

selectively control the steering system using the second autonomous steering command; and     communicate a signal to the controller indicating that the first autonomous steering command is not within the predetermined range of the second autonomous steering command.

16. The apparatus of claim 15, wherein the instructions further cause the processor to, in response to the comparison of the first autonomous steering command and the second autonomous steering command indicating that the first autonomous steering command is within a predetermined range of the second autonomous steering command, selectively control the steering system using the second autonomous steering command.

17. The apparatus of claim 15, wherein the instructions further cause the processor to:

determine whether an issue occurred in the controller; and in response to a determination that an issue occurred with the controller, selectively control the steering system using the first autonomous steering command.

* * * * *